United States Patent
Gentzkow et al.

(10) Patent No.: US 10,565,565 B2
(45) Date of Patent: Feb. 18, 2020

(54) SCHEDULING OF CALENDAR ITEMS BASED ON USER ATTENTIVENESS

(71) Applicant: Microsoft Technology Licensing, LLC, Redmond, WA (US)

(72) Inventors: Hauke Antony Gentzkow, Seattle, WA (US); David Lu, Seattle, WA (US); Schuyler Nicholas Goodman, Maple Valley, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 186 days.

(21) Appl. No.: 15/605,591

(22) Filed: May 25, 2017

(65) Prior Publication Data

US 2018/0341926 A1    Nov. 29, 2018

(51) Int. Cl.
*G06Q 10/10* (2012.01)
(52) U.S. Cl.
CPC .............................. *G06Q 10/1095* (2013.01)
(58) Field of Classification Search
CPC ........... G06Q 10/109; G06Q 10/06398; G06Q 10/06311; G06Q 10/1093; G06Q 10/1095; G06Q 10/063116
See application file for complete search history.

(56) References Cited

U.S. PATENT DOCUMENTS

| | | | |
|---|---|---|---|
| 5,433,223 A | 7/1995 | Moore-Ede et al. | |
| 5,774,867 A * | 6/1998 | Fitzpatrick | G06Q 10/109 705/7.19 |
| 6,167,379 A * | 12/2000 | Dean | G06Q 10/109 705/7.18 |
| 6,735,574 B2 * | 5/2004 | Bull | G06Q 10/06398 705/32 |
| 7,519,924 B2 * | 4/2009 | Bocking | G06Q 10/109 705/7.19 |

(Continued)

FOREIGN PATENT DOCUMENTS

WO    2009052383 A1    4/2009

OTHER PUBLICATIONS

Schmidt, Christian et al., A time to think: Circadian rhythms in human cognition Cognitive Neropsychology, vol. 24, 2007 (Year: 2007).*

(Continued)

*Primary Examiner* — Scott L Jarrett
(74) *Attorney, Agent, or Firm* — Merchant & Gould

(57) ABSTRACT

Attention-based scheduling is provided. Most people's energy levels and cognitive functioning fluctuate throughout the day. Typically, the time of day when a person feels more energetic or has a higher attention span is the time in the person's day when the individual has the highest productivity potential. While at off-peak times, a person may have less attention, which can make it harder for the individual to be effective. An attention-based schedule system identifies a user's high and off-peak times based on one or more attention-based factors. When a meeting or appointment is scheduled and an attention-based scheduling conflict is determined, the user or another scheduler of the calendar item is notified, and in some examples, alternate time suggestions are provided. In some examples, off-peak times are blocked off from the user's calendar.

20 Claims, 12 Drawing Sheets

(56) References Cited

U.S. PATENT DOCUMENTS

| | | | |
|---|---|---|---|
| 7,747,458 B2* | 6/2010 | Lyle | G06Q 10/063116 705/7.19 |
| 8,244,565 B2* | 8/2012 | Galvan | G06Q 10/06398 705/7.11 |
| 8,391,459 B2* | 3/2013 | Jackson | G06Q 10/109 379/210.01 |
| 8,392,503 B2 | 3/2013 | Kuhlke et al. | |
| 8,734,359 B2* | 5/2014 | Ibanez | A61B 5/08 600/529 |
| 8,750,472 B2 | 6/2014 | Shun et al. | |
| 8,904,296 B2 | 12/2014 | Sahai et al. | |
| 8,943,526 B2 | 1/2015 | Rivera et al. | |
| 9,041,766 B1 | 5/2015 | Gates et al. | |
| 9,116,986 B1* | 8/2015 | Jackson | G06F 16/36 |
| 9,129,264 B2* | 9/2015 | Lyle | G06Q 10/063116 |
| 9,269,064 B2* | 2/2016 | Los | G06Q 10/1095 |
| 9,426,421 B2 | 8/2016 | Balasaygun et al. | |
| 9,679,274 B1* | 6/2017 | Roth | G06Q 10/109 |
| 2003/0103415 A1* | 6/2003 | Bates | G06Q 10/109 368/28 |
| 2003/0149606 A1* | 8/2003 | Cragun | G06Q 10/109 705/7.19 |
| 2005/0065832 A1* | 3/2005 | Virta | G06Q 10/109 705/7.18 |
| 2005/0177031 A1* | 8/2005 | Hursh | A61B 5/4809 600/300 |
| 2006/0095859 A1* | 5/2006 | Bocking | G06Q 10/109 715/764 |
| 2006/0218027 A1* | 9/2006 | Carrion | G06Q 10/063116 705/7.16 |
| 2006/0293943 A1* | 12/2006 | Tischhauser | G06Q 10/06314 705/7.24 |
| 2007/0260503 A1* | 11/2007 | Pan | G06Q 10/109 715/772 |
| 2008/0033778 A1* | 2/2008 | Boss | G06Q 10/109 705/7.18 |
| 2008/0034085 A1 | 2/2008 | Chawla et al. | |
| 2008/0059890 A1* | 3/2008 | Zinn | G06Q 10/109 715/751 |
| 2008/0140488 A1* | 6/2008 | Oral | G06Q 10/063116 705/7.16 |
| 2008/0168113 A1* | 7/2008 | Hickling | G06Q 10/109 708/112 |
| 2008/0195448 A1* | 8/2008 | May | G06Q 10/109 705/7.18 |
| 2008/0243582 A1* | 10/2008 | Chen | G06Q 10/06314 705/7.19 |
| 2008/0294483 A1* | 11/2008 | Williams | G06Q 10/063116 705/7.16 |
| 2008/0306997 A1* | 12/2008 | Keohane | G06F 3/0482 |
| 2008/0307323 A1* | 12/2008 | Coffman | G06Q 10/109 715/753 |
| 2009/0024999 A1* | 1/2009 | Ingman | G06Q 10/109 718/102 |
| 2009/0132329 A1* | 5/2009 | Lam | G06Q 10/06311 705/7.13 |
| 2009/0299807 A1* | 12/2009 | Schiller | G06Q 10/109 705/7.18 |
| 2010/0076804 A1* | 3/2010 | Jones | G06Q 10/109 705/7.18 |
| 2010/0088143 A1* | 4/2010 | Platt | G06Q 10/063116 705/7.18 |
| 2010/0094678 A1* | 4/2010 | Gupta | G06Q 10/109 705/7.19 |
| 2010/0161367 A1* | 6/2010 | Keohane | G06Q 10/109 705/7.19 |
| 2010/0169146 A1* | 7/2010 | Hoyne | G06Q 10/109 705/7.21 |
| 2010/0192162 A1* | 7/2010 | Conner | G06Q 10/109 719/318 |
| 2011/0184943 A1* | 7/2011 | Norton | G06Q 10/02 707/723 |
| 2012/0233563 A1* | 9/2012 | Chakra | G06Q 10/1093 715/772 |
| 2013/0204535 A1 | 8/2013 | Kapoor et al. | |
| 2013/0204653 A1* | 8/2013 | Herger | G06Q 10/109 705/7.19 |
| 2013/0246116 A1* | 9/2013 | Bank | G06Q 10/109 705/7.19 |
| 2014/0123030 A1 | 5/2014 | Kozloski et al. | |
| 2014/0164043 A1* | 6/2014 | Jordan | G06Q 10/1095 705/7.19 |
| 2015/0148871 A1* | 5/2015 | Maxik | H05B 33/0863 607/88 |
| 2015/0186850 A1* | 7/2015 | Ramji | G06Q 10/1095 705/7.19 |
| 2015/0324755 A1* | 11/2015 | Bathiya | G06Q 10/1095 705/7.19 |
| 2015/0347981 A1* | 12/2015 | Adler | G06Q 10/1095 705/7.19 |
| 2016/0217432 A1* | 7/2016 | Yavor | G06Q 10/1093 |
| 2016/0232131 A1* | 8/2016 | Liu | G06F 17/211 |
| 2016/0267439 A1* | 9/2016 | Bitran | G06Q 10/1093 |
| 2016/0350720 A1* | 12/2016 | Moorjani | G06Q 10/1095 |
| 2016/0364698 A1* | 12/2016 | Bouz | G06Q 10/1095 |
| 2017/0070305 A1 | 3/2017 | Bowden et al. | |
| 2017/0091715 A1* | 3/2017 | Abou Mahmoud | G06Q 10/1095 |
| 2017/0116552 A1* | 4/2017 | Deodhar | G06Q 10/06316 |
| 2017/0132946 A1* | 5/2017 | Kinnunen | G09B 5/02 |
| 2017/0178259 A1* | 6/2017 | Goldstein | G06Q 10/02 |
| 2017/0193459 A1* | 7/2017 | Crasso | G06Q 10/1097 |
| 2017/0238868 A1* | 8/2017 | Kenyon | A61B 5/02055 |
| 2017/0309196 A1* | 10/2017 | Vangala | G09B 5/125 |
| 2017/0316386 A1* | 11/2017 | Joshi | G06Q 10/1091 |
| 2018/0056130 A1* | 3/2018 | Bitran | A63B 24/0075 |
| 2018/0060500 A1* | 3/2018 | Ni | G06F 19/324 |
| 2018/0114194 A1* | 4/2018 | Tabrizi | G06Q 10/1095 |
| 2018/0218332 A1* | 8/2018 | Soni | G06Q 10/1095 |
| 2018/0293550 A1* | 10/2018 | Liang | G06Q 10/1095 |
| 2018/0336533 A1* | 11/2018 | Avalos Vega | G06Q 10/1095 |
| 2018/0374057 A1* | 12/2018 | Vardidze | G06Q 10/06 |

OTHER PUBLICATIONS

Berry, Pauline M. et al., PTIME: Personalized Assistance for Calendaring ACM Transactions on Intelligent Systems and Technology, vol. 2, No. 4, Jul. 2011 (Year: 2011).*

Carrier, Julie et al., Circadian Rhythms of Performance: New Trends Chronobiology International, vol. 17, No. 6, 2000 (Year: 2000).*

Blatter, Katharianna et al., Circadian Rhythms in cognitive performance: Methodical constraints, protocols, theoretical underpinnings, Physiology & Behavior, vol. 90, 2007 (Year: 2007).*

Gervasio, Melinda T. et al., Activer Preference Learning for Personalized Calendar Scheduling Assistance ACM, IUI'05, Jan. 9-12, 2005 (Year: 2005).*

Valdez, Pablo et al., Circadian rhythms in cognitive performance: implications for neuropsychological assessment ChronoPhysiology and Therapy, 2012 (Year: 2012).*

Altrogge, Stephen, Master Your Time: 5 Daily Scheduling Methods to Bring More Focus to Your Day Zapier.com, Nov. 1, 2016 (Year: 2016).*

Randler, Christoph, Morningness-eveningness, sleep-wake variables and big five personality factors Personality and Individual Differences, vol. 45, 2008 (Year: 2008).*

Valdez, Pablo et al., Rhythms of Mental Performance Journal Compliation, International Mind, Brain and Education Society, vol. 2, No. 2, 2008 (Year: 2008).*

Barnes, Christopher M., The Ideal Work Schedule, as Determined by Circadian Rhythms Harvard Business Review, Jan. 28, 2015 (Year: 2015).*

Monk, Timothy H. et al., The Post-Lunch Dip in Performance Clinical Sports Medicine, vol. 24, 2005 (Year: 2005).*

Stiefelhagen, et al., "Modeling Focus of Attention for Meeting Indexing Based on Multiple Cues", In Journal of IEEE Transactions on Neural Networks, vol. 13, Issue. 4, Jul. 2002, pp. 928-938.

(56) References Cited

OTHER PUBLICATIONS

Bailey, Chris, "How to calculate your Biological Prime Time—the time of the day you're the most productive", http://alifeofproductivity.com/calculate-biological-prime-time/, Published on: Dec. 12, 2013, 7 pages.

Alfred, Krzywicki, et al., "An adaptive calendar assistant using pattern mining for user preference modelling", In Proceedings of the 15th international conference on Intelligent user interfaces, Feb. 7, 2010, pp. 71-80.

"International Search Report and Written Opinion Issued in PCT Application No. PCT/US2018/029248", dated Jul. 6, 2018, 14 Pages.

* cited by examiner

SCHEDULING OF CALENDAR ITEMS BASED ON USER ATTENTIVENESS

BACKGROUND

Teamwork in the workplace has become commonplace. When working with a team, a user can expect to participate in various meetings, and thus to receive invitations to a variety of internal meetings, client conference calls, lunch requests, and the like. The user is likely to respond to a meeting request based on whether the meeting conflicts with another on the user's calendar, which the user is oftentimes alerted about in the request. Or, when a meeting is being scheduled, the scheduler may utilize a scheduling assistant functionality that checks other individuals' calendars to find a best time for a meeting or appointment or alerts the scheduler when a meeting or appointment conflicts with another on the user's or an attendee's calendar.

When making a decision on when to schedule a meeting or whether to accept or decline a meeting request, current scheduling systems disregard an individual's attention or alertness level. For example, it is commonly known that people's energy levels and cognitive functioning fluctuate throughout the day, and typically dip in the afternoon. That is, most people will have certain points in their days when they feel more energetic, and it is likely that these are the times in the people's days with the highest productivity potential for them. Likewise, there are certain points in a person's day when that person feels less energetic, and it is likely that these times are the lowest productivity times for the person. At off-peak times, a meeting attendee may have less attention, which can make it harder for the meeting attendee to absorb new information or to resist distractions. A person's high and off-peak times can be based on the person's circadian rhythm, or on other factors, such as other activities in the person's day. However, when a meeting or appointment conflicts with an individual's high-potential time (i.e., the meeting or appointment occurs outside of the time when the individual is more productive), current scheduling systems do not provide scheduling functionalities that provide for attention-based scheduling.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer readable storage device for providing attention-based scheduling. An attention-based scheduling system includes an attention service that is operative to optimize scheduling of calendar items, such as appointments or meetings, based on when a user is likely to feel more energetic, and thus has the highest productivity potential. According to an aspect, the user's high and off-peak times are identified based on one or more attention-based factors, which can be user-specified or determined based on user input or responses. When scheduling a meeting or appointment or when receiving an invitation to a meeting, a scheduler of the calendar item or the user is notified when an attention-based conflict of the calendar item at a selected timeslot is determined. In some examples, alternate time suggestions are provided. In some examples, off-peak times are blocked off from the user's calendar.

As can be appreciated, by optimizing scheduling based in part on a user's effective attention level, user productivity can be improved. Further, when the user or a scheduler is notified of a possible attention-based conflict when scheduling a meeting or appointment, the user or scheduler is enabled to select an alternate meeting time prior to sending out meeting invitations, which averts extraneous computer processing and provides for more efficient scheduling.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
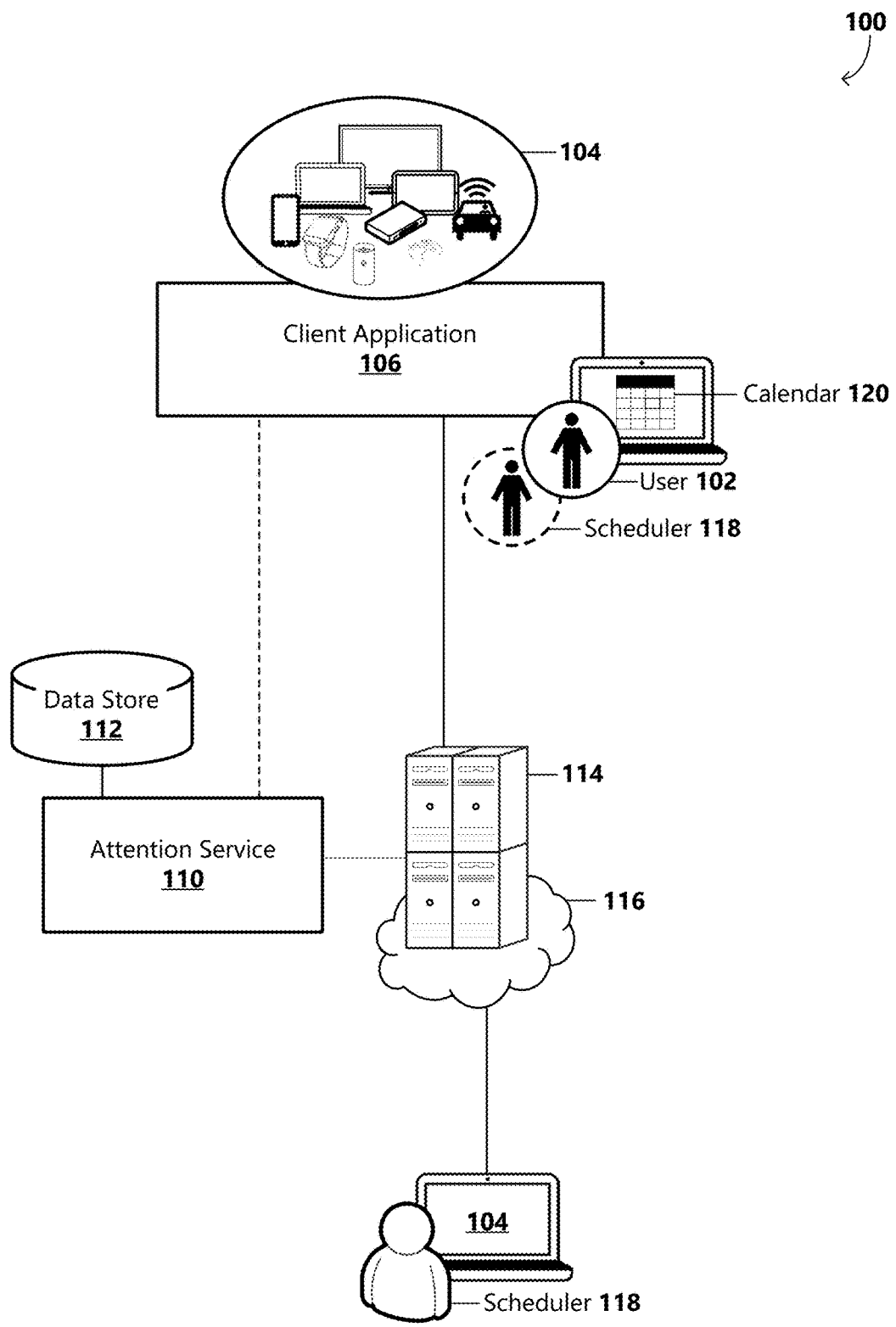
FIG. 1 is a block diagram of an example operating environment including an attention-based scheduling system for providing scheduling based on a user's effective attention level.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable storage device for providing attention-based scheduling. With reference now to FIG. 1, an example operating environment is shown including an attention-based scheduling system 100 for scheduling appointments or meetings based on when an individual is likely to feel more energetic, and thus has the highest productivity potential. The system 100 includes a client computing device 104, wherein the client computing device 104 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications for performing a variety of tasks. The hardware of these computing devices is discussed in greater detail in regard to FIGS. 5, 6A, 6B, and 7.

A user may utilize an application 106 on a client computing device 104 for a variety of tasks, which may include, for example, to write, calculate, draw, organize, prepare and view presentations, send and receive electronic mail, schedule meetings or appointments, take and organize notes, make music, and the like. According to an aspect, the client application 106 is an electronic calendar application that provides functionalities for scheduling calendar items, such as appointments, events, meetings, and the like. In some examples, the calendar application 106 is a thick or smart client application that performs most operations on its local host machine (i.e., client computing device 104) and interacts with a calendar server 114 over a network 116 or combination of networks (e.g., the Internet, wide area networks, local area networks). In other examples, the calendar application 106 is a thin client application (i.e., web application) that resides on a remote server 114 and is accessible over a network 116 or combination of networks (e.g., the Internet, wide area networks, local area networks). A thin client application may be hosted in a browser-controlled environment or coded in a browser-supported language and reliant on a common web browser to render the application executable on the client computing device 104.

In one example, the user 102 acts as a scheduler 118 who is enabled to schedule an appointment, which is a block of time that the user is able to schedule in the user's calendar 120 that does not involve reserving resources or inviting other people. To schedule an appointment, the user 102/scheduler 118 may select a desired time in the user's calendar 120 or a "new appointment" functionality and then enter appointment information, such as a subject, a location, a start time, an end time, and the like. Upon saving, the appointment is added to the user's calendar 120 at the selected timeslot.

In another example, the user 102 or another scheduler 118 is enabled to schedule a meeting, which is an appointment that allows for inviting other people, reserving resources, creating and sending meeting requests, etc. When creating a meeting, the scheduler 118 (who in some examples is user 102) identifies people to invite and any resources to reserve and picks a meeting time. Upon saving, the meeting is added to the scheduler's calendar 120 at the selected meeting time, and a meeting request is sent to each invitee.

In some examples, when scheduling an appointment or a meeting or when an appointment or meeting has been scheduled that immediately follows or precedes another calendar item or conflicts with another calendar item, an indication is provided that informs the scheduler 118 or user 102 of the adjacency or conflict. According to an aspect, the attention-based scheduling system 100 includes an attention service 110 illustrative of a software module, system, or device operative to provide scheduling functionalities (e.g., notifications, scheduling blocking, suggestions) based on a user's attention or alertness level.

In some examples, a user's level of attention or alertness is determined based on user-specific information. In one example, the attention service 110 provides for enabling the user 102 to select or enter information (e.g., through a set-up process) that specifies at which times of the day that the user 102 considers to be high and/or low productivity times. That is, the user 102 is able to specify at what times of the day that the user 102 feels that the user 102 has higher energy levels, and thus are the user's high peak or high productivity times. In some cases, the user's high and off-peak times are based on the user's circadian rhythm. During high peak or high productivity times, the user 102 is likely to have more focused attention which can help the user to absorb new information, to think more clearly, or to resist distractions. Attention-based information provided by the user 102 is stored in a data store 112, with which the attention service 110 is in communication. The data store 112 may comprise one data store or a plurality of data stores.

In other examples, the attention service 110 is operative to provide various cognitive tasks or attention-based exercises to the user 102 that the user 102 completes at various times over a day (or multiple days) for measuring or determining the user's high and low productivity times. For example, the exercises are designed to target various cognitive functions, such as memory, processing speed, and concentration. The user's performance of the exercises are scored for determining the user's high and off-peak attention times. In some examples, the exercises are provided to the user 102 in a set-up process or phase. In other examples, the exercises are provided to the user 102 on a recurrent or periodic basis. Attention-based information determined from attention-based exercises are stored in the data store 112.

In other examples, a user's attention or alertness level is determined based on general or group-sourced data. For example, it is commonly known that in general, people's energy levels and cognitive functioning fluctuate throughout the day and typically dip in the afternoon. Therefore, the attention service 110 is operative to determine that the user's high peak attention time is in the morning, and the user's off-peak time is in the afternoon based on general information.

In other examples, a user's attention or alertness level is determined based on user interaction data. For example, user interaction includes how the user 102 schedules meetings or appointments. As the user 102 adds calendar items to the user's calendar 120 or as the user 102 responds to meeting requests, the attention service 110 analyzes data associated with the calendar items and the user's responses for determining such information as the times of day the user prefers to schedule meetings or appointments, which can be indicative of the user's high and off-peak attention times. For example, the attention service 110 is operative to detect that the user 102 typically schedules or accepts meetings in the morning and oftentimes declines meeting requests for meetings scheduled after lunch which can be used to determine that the morning hours are a higher productivity time for the user 102. User interaction data are stored in the data store 112.

In other examples, a user's attention or alertness level is determined based on collected data associated with the user's online activity during a meeting. For example, the collected data can be analyzed for determining how often the user 102 is engaged online during a meeting. In one example, one or more APIs are leveraged to identify how often the user 102 interacts with particular applications, how often the user 102 checks the user's email, chats using an instant messaging application, etc., during meetings at different times of the day. The collected data are stored in the data store 112.

In some examples, when analyzing data associated with calendar items, the attention service 110 is further operative to determine a meeting or appointment type or an attention cost associated with a particular meeting or appointment. According to one example, the user 102 or a scheduler 118 is enabled to categorize a calendar item or to provide classifying information that can be used to categorize the calendar item (e.g., a team meeting, a disclosure meeting, a personal activity, a recreational activity). According to another example, the attention service 110 is operative to parse a calendar item (e.g., subject, notes, meeting request content) for determining a category or a type of meeting or appointment to associate with the calendar item. According to an aspect, certain calendar item categories or types of meetings or appointments have a predetermined attention cost associated with them, which enables the attention service 110 to determine an attention cost associated with a particular calendar item. For example, a budget planning meeting may have a higher attention cost associated with it than a monthly group update meeting. Calendar item information and associated attention costs are stored in the data store 112.

According to an aspect, the attention service 110 is operative to determine when an attention-based scheduling conflict is generated based on scheduling a calendar item at a particular timeslot in the user's calendar 120, for example, based on one or a combination of a user's determined high and off-peak attention times, calendar item attention cost information, previously-scheduled calendar items, and other calendar information. For example, the attention service 110 is operative to create a scheduling rule based on predetermined or user-specified conditions, such as the time of day, the day of the week, a maximum number of meetings or appointments in a particular time frame (e.g., day, days, week), a maximum attention cost for meetings or appointments in a given time frame, etc.

According to one example, the attention service 110 blocks off portions of time in the user's calendar 120 that are determined to be off-peak attention times. In some examples, when a portion of the user's day is blocked off, the user 102 or a scheduler 118 is prevented from scheduling a calendar item during the blocked off time. In other examples, the user 102 or scheduler 118 is able to override a blocked off time. In other examples, when scheduling an appointment or a meeting or when an appointment or meeting has been scheduled that occurs during a blocked off time, a notification is provided that informs the scheduler 118 or user 102 of the attention-based scheduling conflict.

According to another example, the attention service 110 looks at other calendar items on the user's calendar 120, and determines when a number of calendar items scheduled in a day or another time period meets or exceeds a predetermined or user-specified threshold. Accordingly, in some examples, the attention service 110 is operative to block off non-committed times in the day or time period to prevent other schedulers 118 from scheduling another meeting. In other examples, when the user 102 or a scheduler 118 tries to schedule another meeting or appointment in a day where the number of calendar items scheduled meets or exceeds the predetermined or user-specified threshold, the attention service 110 is operative to notify the user 102 or the scheduler 118 that there is a conflict, which, in some examples, the user 102 or scheduler 118 can elect to override or ignore.

In other examples, the attention service 110 provides suggestions of other times on the user's calendar 120 that are consistent with the user's high-peak attention times, such as during a particular high-peak time of the day for the user 102 or on a day when the meeting or appointment does not exceed a predetermined or user-specified threshold, such as a maximum number of calendar items or a maximum attention cost for a particular time period.

Figure 2A:
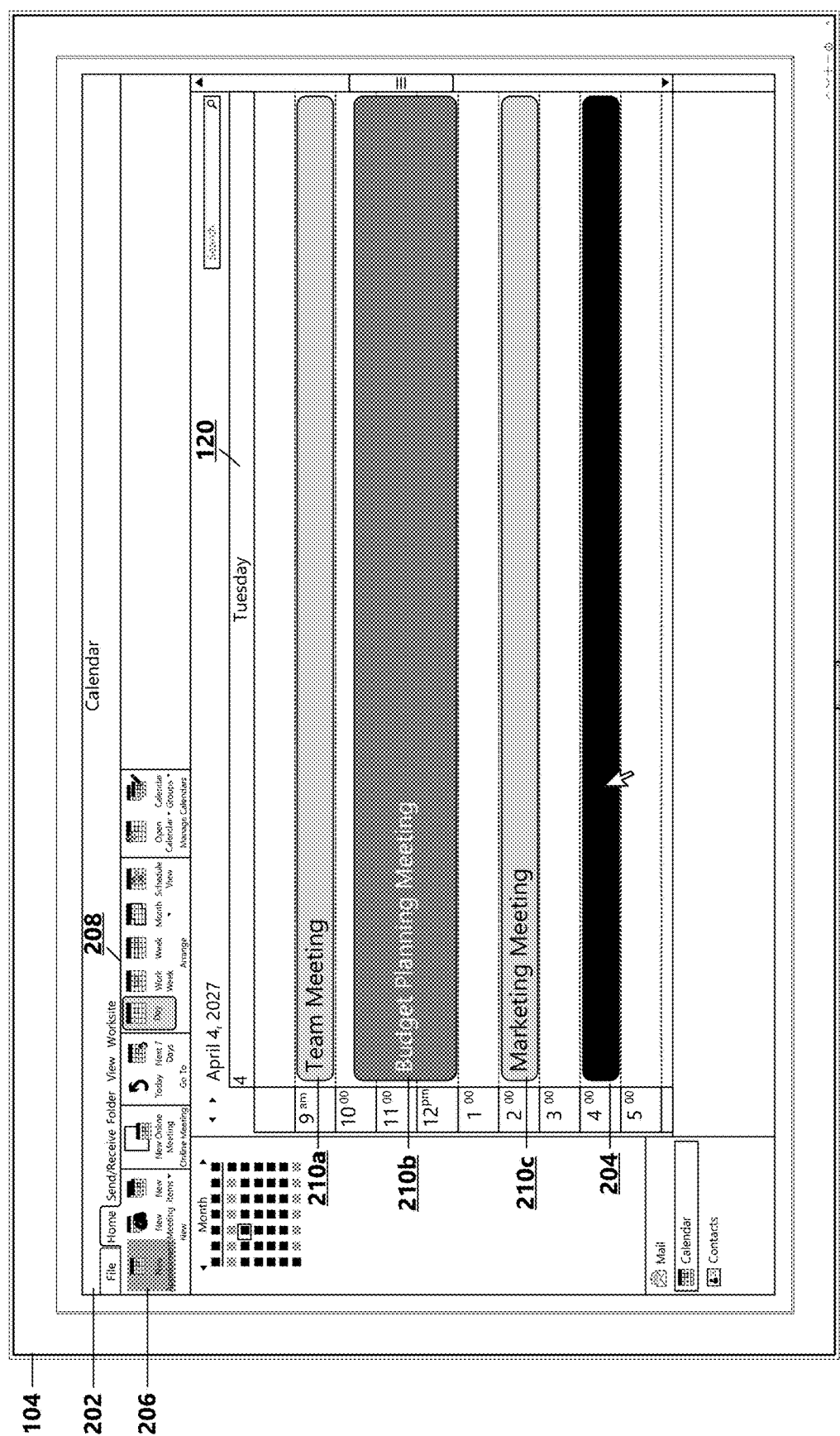
FIGS. 2A-2D illustrate example user interface (UI) screens that are generated by aspects of the attention-based scheduling system when scheduling a new calendar item.

FIGS. 2A-2D illustrate example user interface (UI) screens that are generated by aspects of the attention-based scheduling system 100. Although the examples illustrated in FIGS. 2A-2D are described in the context of a user 102 scheduling a calendar item on the user's own calendar 120, the illustrated and described aspects can be applied to a scheduler 118 scheduling a calendar item for which the user 102 is an invitee or attendee. With reference now to FIG. 2A, a user's calendar 120 is displayed in an example calendar application UI 202. According to examples, the UI 202 is provided for enabling a user 102 to interact with functionalities of the calendar application 106 and with calendar items through manipulation of graphical icons, visual indicators, and the like. Various UI technologies may be utilized. For example, user input may be received via hardware input devices, such as mice, keyboards, remote controls, pen/stylus, and the like. As another example, user input may be received via natural input devices/methods that enable the user 102 to interact with the computing device 104 in a "natural" manner, such as those relying on speech recognition, touch and stylus recognition, gesture recognition both on screen and adjacent to the screen, air gestures, head and eye tracking, voice and speech, vision, touch, hover, gestures, and machine intelligence.

In the illustrated example, a calendar item scheduling command is being initiated by a user-selection of a timeslot 204 in the calendar 120. For example, the user 102 is enabled to schedule a new calendar item (e.g., appointment, meeting, event) directly on the calendar 120. As should be appreciated, other methods are possible for initiating scheduling of a new calendar item, such as via selecting a button 206 displayed in a toolbar 208 in the UI 202, by providing a gesture, spoken command, etc. As illustrated, a plurality of previously-scheduled calendar items 210a-c are displayed in the user's calendar 120 on the day in which the user 102 is initiating the scheduling of the new calendar item.

Figure 2B:
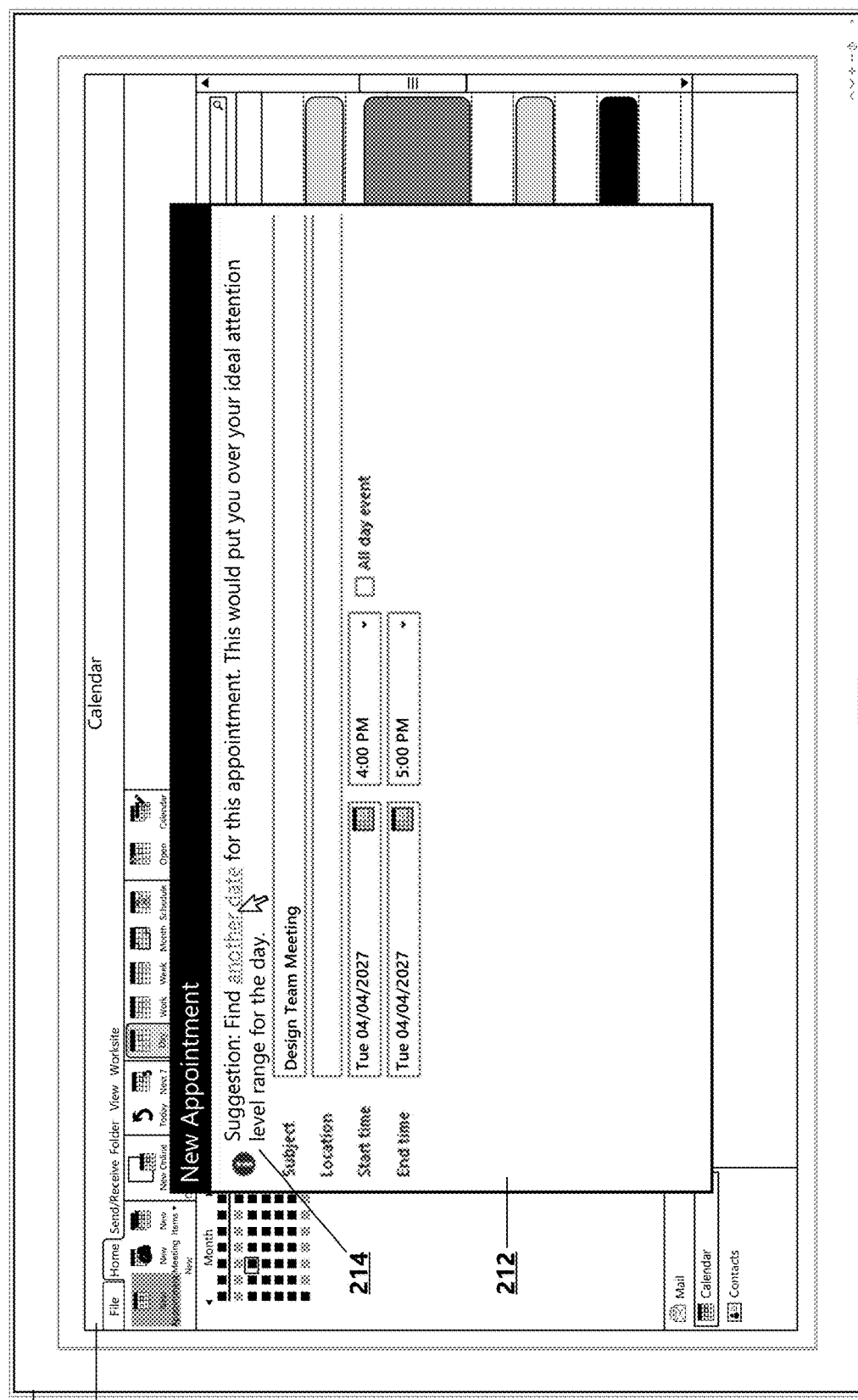

With reference now to FIG. 2B, a calendar item window 212 is opened and displayed in the UI 202. For example, various boxes are provided in the calendar item window 212 for enabling the user 102 to specify calendar item information, such as a subject for the calendar item, a location, a start time, an end time, etc. According to an aspect, the attention service 110 is operative to determine that the new calendar item at the selected timeslot 204 would put the user 102 over the user's effective attention level range for the day. For example, a predetermined, determined, or user-specified condition for an attention service rule may be that an effective attention level range for the user 102 includes a maximum number of three calendar items 210 in a day, and the new calendar item would exceed the maximum number of calendar items 210 for the day. As another example, a predetermined, determined, or user-specified condition for an attention service rule may be that after 3:00 PM is a low-peak time for the user 102, and the selected timeslot 204 is during the low-peak time. As another example, a predetermined, determined, or user-specified condition for an attention service rule may be that an effective attention level range for the user 102 includes a certain maximum attention cost per day, where each calendar item 210 on the user's calendar 120 has a particular attention cost associated with it, and the attention cost of the new calendar item would exceed the maximum attention cost for the day.

As illustrated in FIG. 2B, upon determining that the new calendar item at the selected timeslot 204 would put the user 102 over the user's effective attention level range for the day, in one example, the attention service 110 provides a notification 214 that alerts the user 102 (or a scheduler 118) that there is a scheduling conflict. In some examples, the notification 214 mentions that the scheduling conflict is attention-based.

Figure 2C:
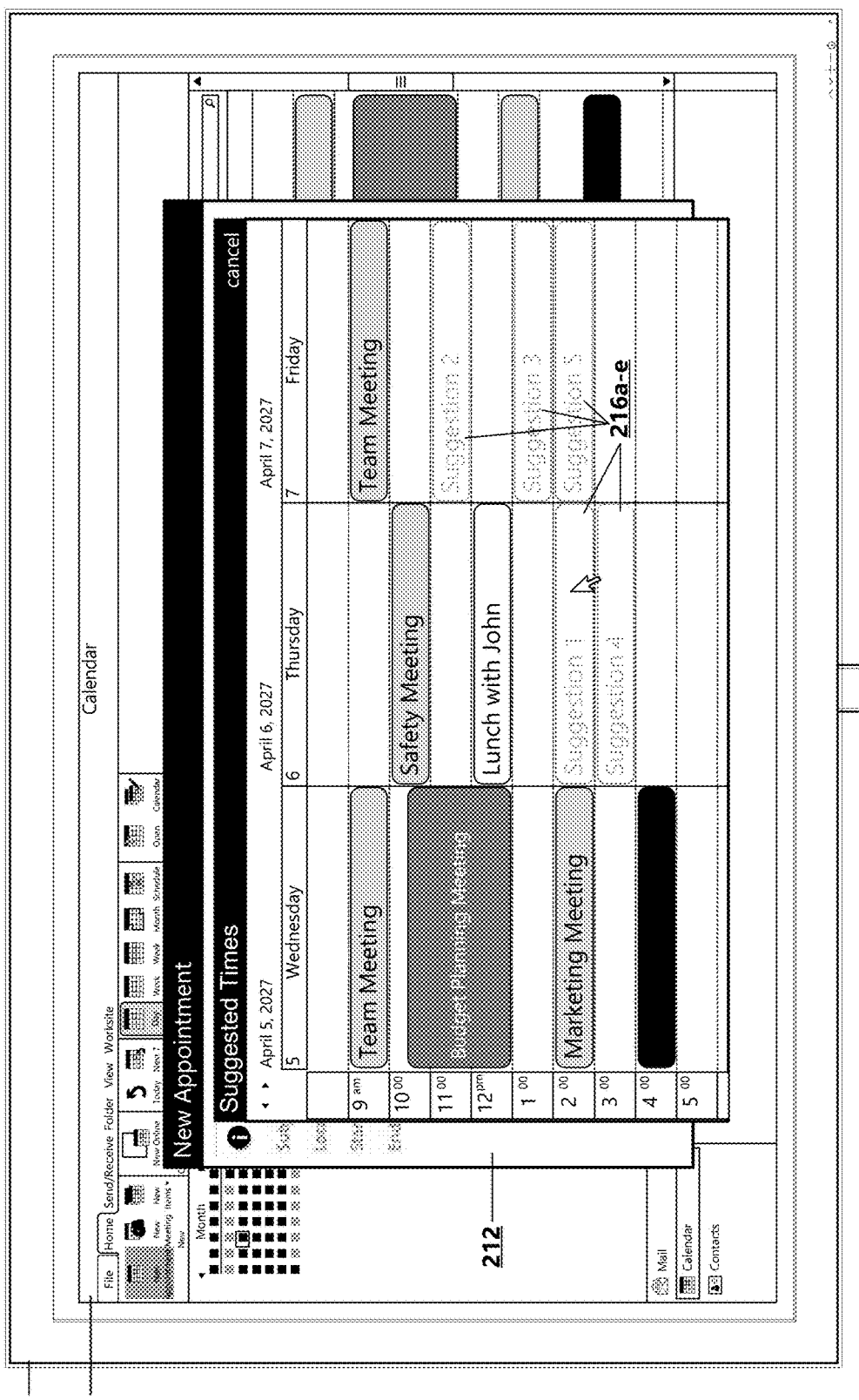
Figure 2D:
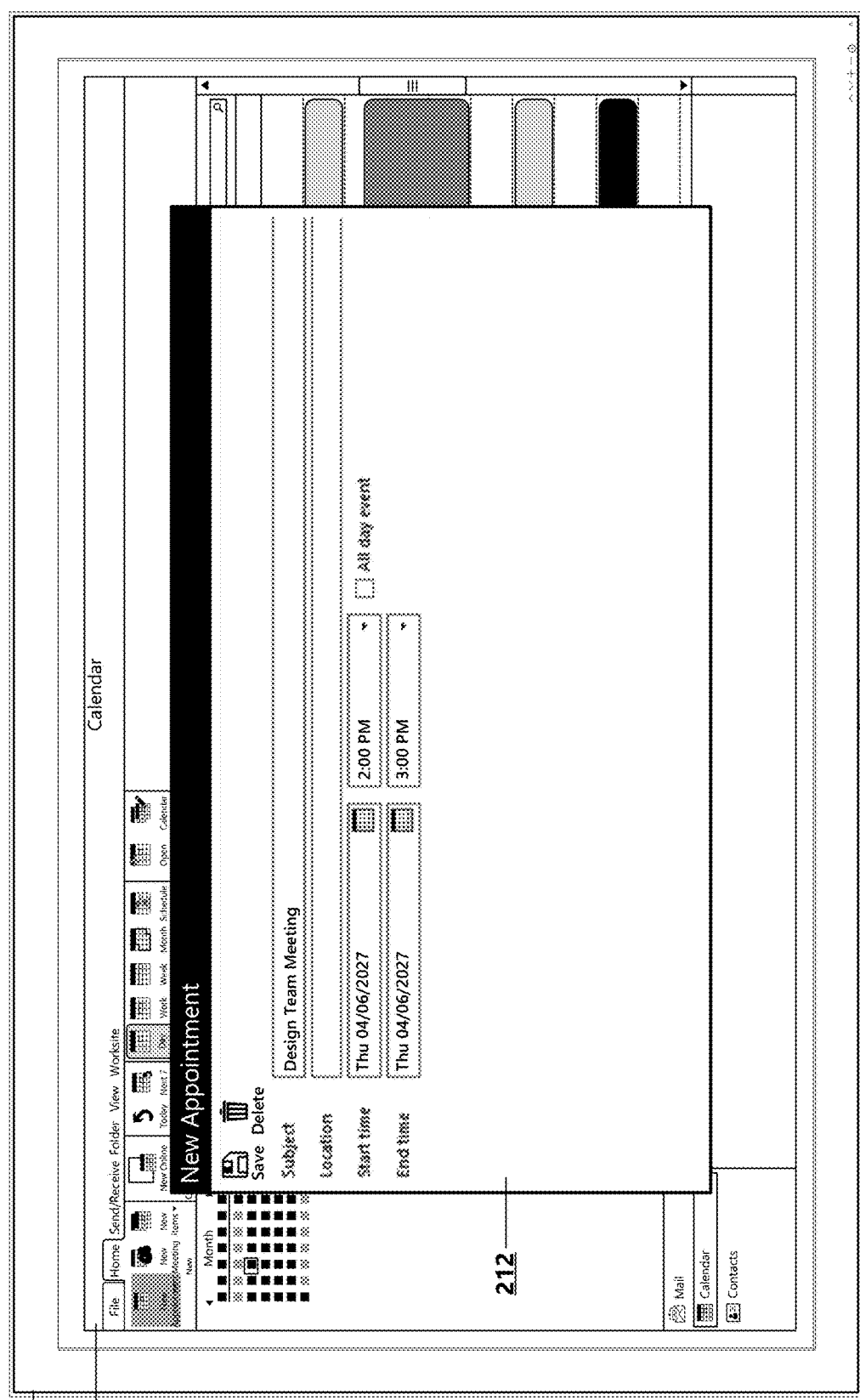

With reference now to FIG. 2C, the attention service 110 is operative to determine one or more alternate time suggestions 216a-e for the new calendar item based on the user's availability and attention data. Accordingly, the alternate time suggestions 216a-e are provided in the UI 202. One or more of the suggestions 216 may be on the same day or on other days as the initially-selected timeslot 204 for the new calendar item. According to one example, the suggestions 216 are ordered based on a best fit with the user's schedule according to the user's availability and attention-based conditions and rules. In some examples, the user 102 (or scheduler 118) is enabled to select a suggested timeslot (alternate time suggestion 216). According to an example and as illustrated in FIG. 2D, upon receiving a selection of an alternate time suggestion 216a, the new calendar item is updated with the selected alternate time suggestion 216a.

Figure 3:
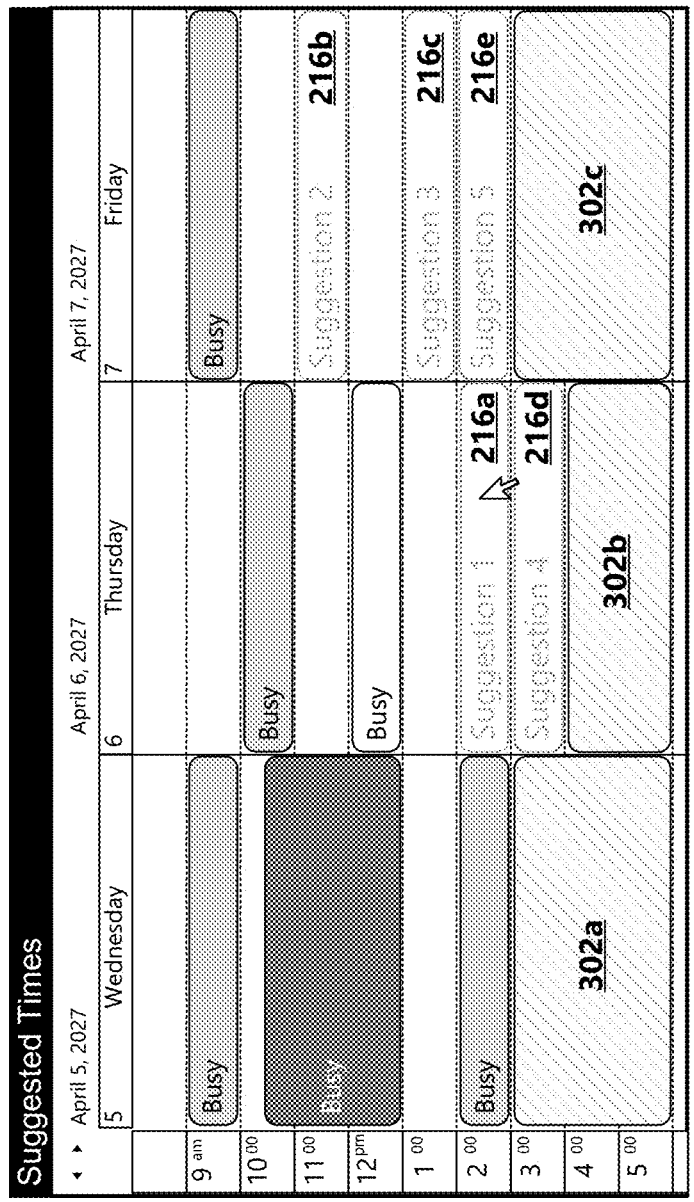
FIG. 3 illustrates an example UI display generated by aspects of the attention-based scheduling system that shows a plurality of alternate time suggestions and blocked off timeslots.

FIG. 3 illustrates an example UI 300 display generated by aspects of the attention-based scheduling system 100 that shows a plurality of alternate time suggestions 216a-e and blocked off timeslots 302a-c. Although the illustrated example is described in the context of a scheduler 118 scheduling a calendar item for which the user 102 is an invitee or an attendee, the illustrated and described aspects can be applied to the user 102 scheduling a calendar item on the user's own calendar 120. For example, the attention service 110 blocks off portions of time in the user's calendar 120 based on predetermined, determined, or user-specified conditions that cause the particular timeslots 204 to be off-peak (e.g., time of day) or that cause the calendar item to exceed a threshold (e.g., maximum number of calendar items for a time period, maximum attention cost for a time period).

In some examples, the scheduler 118 is not able to select a blocked off timeslot 302 on the user's calendar 120 for scheduling a meeting. In other examples, the scheduler 118 is enabled to override a block and schedule a meeting during a blocked off timeslot 302. As illustrated, one or more alternate time suggestions 216a-e for the new meeting are provided to the scheduler 118 based on the user's availability and attention data.

Figure 4A:
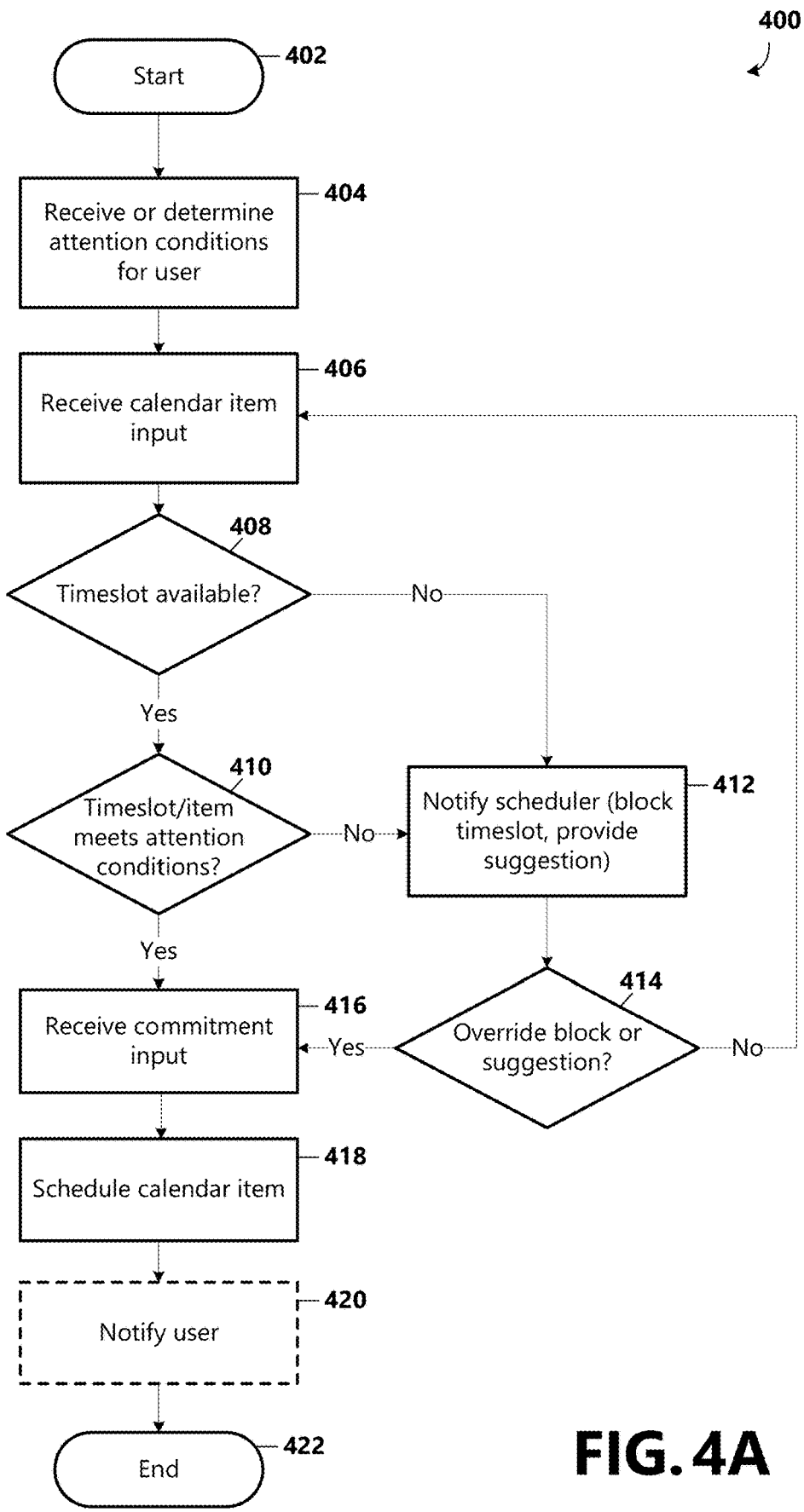
FIG. 4A is a flow chart showing general stages involved in an example method for providing attention-based scheduling.

FIG. 4A is a flow chart showing general stages involved in an example method 400 for providing attention-based scheduling. The method 400 starts at OPERATION 402, and proceeds to OPERATION 404, where attention information associated with a user 102 is received or determined. In some examples, a user's level of attention or alertness is determined based on user-specified information, such as times of the day that the user 102 considers to be the user's high and/or low productivity times. In other examples, the attention service 110 provides various attention-based exercises that the user 102 completes at various times over a day (or multiple days) for measuring or determining the user's high and low productivity times. The user's performance of the exercises are scored for determining the user's high and off-peak attention times. In other examples, the user's attention or alertness level is determined based on general or group-sourced data. In other examples, user interaction data (e.g., how the user 102 schedules meetings or appointments or responds to meeting requests) is analyzed for the user's high and off-peak attention times. The attention information can be utilized as conditions for creating various attention service rules.

The method 400 proceeds to OPERATION 406, where calendar item input is received. For example, a user 102 or scheduler 118 can initiate scheduling a new calendar item (e.g., appointment, meeting, event) directly on a calendar 120 (e.g., via selecting a timeslot 204), via selecting a button 206 displayed in a toolbar 208 in the UI 202, by providing a gesture, spoken command, etc. Further, the user 102 or scheduler 118 can provide various calendar item details, such as a subject, a location, a start time, an end time, and the like. In some examples, a meeting/appointment type or category is selected or entered by the user 102 or scheduler 118.

The method 400 proceeds to DECISION OPERATION 408, where a determination is made as to whether a selected timeslot 204 for the new calendar item is available (e.g., based on whether previously-scheduled calendar items 210 conflict with the new calendar item). When a determination is made that the selected timeslot 204 is available, the method 400 proceeds to DECISION OPERATION 410, where a determination is made as to whether the new calendar item at the selected timeslot 204 would put the user 102 over the user's effective attention level range for the day or other time period, for example, based on predetermined, determined, or user-specified attention-based conditions and rules. According to an example, the predetermined, determined, or user-specified attention-based conditions and rules are associated with the user's level of attention or alertness at various times of the day. For example, attention-based conditions can be used by the attention service 110 for determining whether a new calendar item at a selected timeslot 204 occurs during an off-peak time, or whether the calendar item exceed a threshold (e.g., maximum number of calendar items for a time period, maximum attention cost for a time period). In some examples, the attention service 110 analyzes calendar item details for determining an attention cost for the calendar item.

When a determination is made that the new calendar item at a selected timeslot 204 does not meet attention conditions, or when the selected timeslot is determined not to be available at DECISION OPERATION 408, the method 400 proceeds to OPERATION 412 where the scheduler 118 (which can be the user 102) is notified of the attention-based conflict. In some examples, the timeslot 204 is blocked. In other examples, one or more alternate time suggestions 216 are provided.

The method 400 proceeds to DECISION OPERATION 414, where a determination is made as to whether the scheduler 118 selects to override a blocked off timeslot 302 or to override or ignore the one or more alternate time suggestions 216. That is, a determination is made as to whether the scheduler 118 selects to schedule the new calendar item at the selected timeslot 204 although it is in conflict with the user's effective attention level range. When a determination is made that the scheduler 118 does not override a blocked off timeslot 302 or to override or ignore the one or more alternate time suggestions 216, the method 400 returns to OPERATION 406, where other calendar item input is received (e.g., the scheduler 118 selects another timeslot 204, omits the user 102 as an invitee).

When a determination is made that the scheduler 118 selects to schedule the new calendar item at the selected timeslot 204 although it is in conflict with the user's effective attention level range, or when a determination is made at DECISION OPERATION 410 that the new calendar item at the selected timeslot 204 would not put the user 102 over the user's effective attention level range for the day or other time period, the method 400 proceeds to OPERATION 416, where a commitment input is received. In some examples, the commitment input is a selection of a save command. In other examples, the commitment input is closing a new calendar item window. In other examples, the commitment input is a gesture, spoken command, or other input.

The method 400 proceeds to OPERATION 418, where the new calendar item is scheduled. For example, when the user 102 is scheduling the calendar item, the new calendar item is added to the user's calendar 120. In another example, when another scheduler 118 is scheduling the calendar item, a meeting request is sent to the user 102.

The method 400 proceeds to OPTIONAL OPERATION 420, where a notification of an attention-based conflict is provided to the user 102. For example, when a scheduler 118 who is not the user 102 overrides a blocked off timeslot 302 or overrides or ignores alternate time suggestions 216, a notification is provided to the user 102 in the meeting request or on the user's calendar 120. The user 102 is then enabled to accept or decline the meeting request based on the attention information. The method 400 ends at OPERATION 422.

Figure 4B:
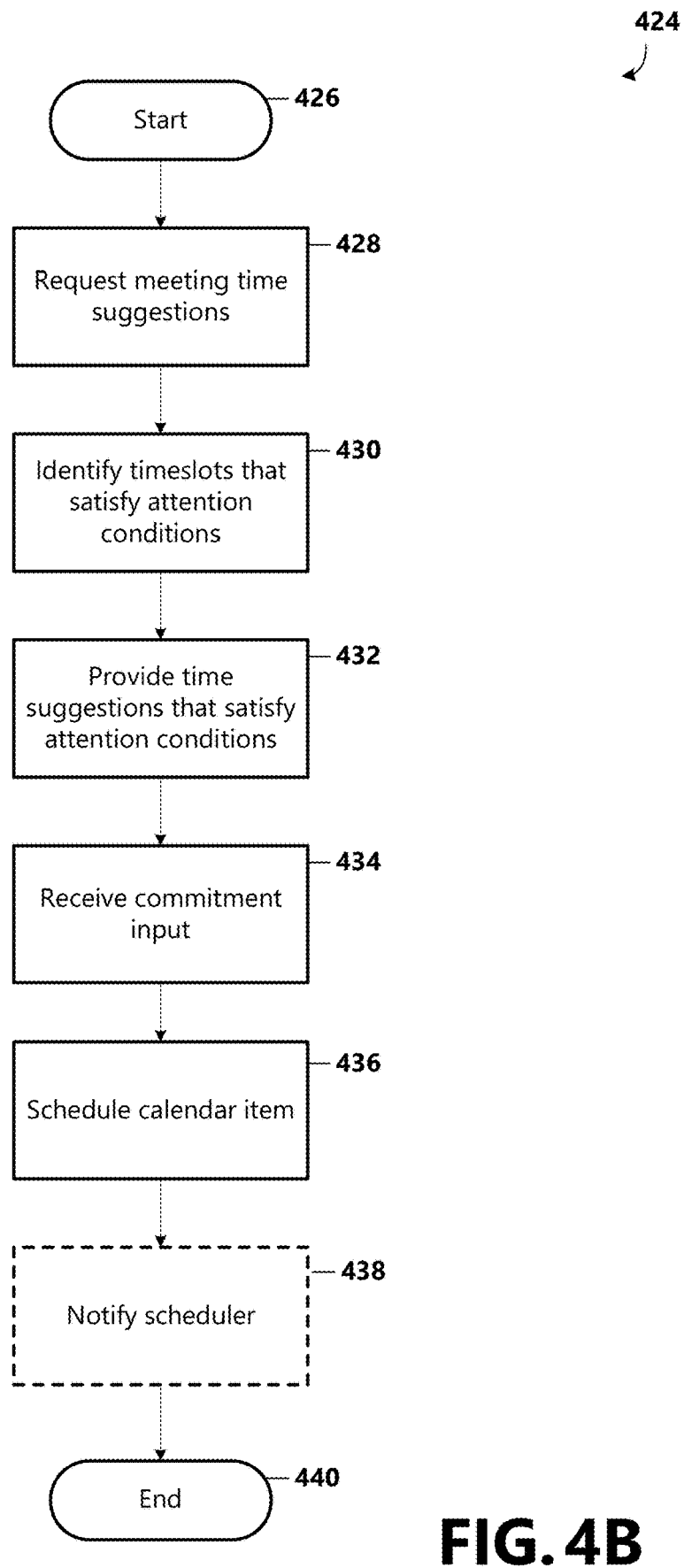
FIG. 4B is a flow chart showing general stages involved in another example method for providing attention-based scheduling.

FIG. 4B is a flow chart showing general stages involved in another example method 424 for providing attention-based scheduling. The method 424 starts at OPERATION 426, and proceeds to OPERATION 428, where a request is received for meeting time suggestions. For example, a scheduler 118 initiates scheduling of a calendar item (e.g., meeting) for one or more attendees, and a request is sent to the calendar server 114 for suggested meeting times for the one or more attendees. In one example, the scheduler 118 is the user 102. In another example, the user 102 is an attendee.

The method 424 proceeds to OPERATION 430, where one or more timeslots 204 that satisfy attention conditions for attendees are identified. In one example, the attention service 110 identifies timeslots 204 that do not occur during an off-peak time for attendees. In another example, the attention service 110 identifies timeslots 204 where the calendar item would not exceed a threshold (e.g., maximum number of calendar items for a time period, maximum attention cost for a time period).

The method 424 proceeds to OPERATION 432, where the one or more identified timeslots 204 that satisfy attention conditions for attendees are provided as meeting time suggestions to the scheduler 118. In some examples, timeslots 204 that do not satisfy attention conditions for attendees are blocked off or an indication is provided that the timeslots do not satisfy attention conditions for a given attendee.

At OPERATION 434, a commitment input is received. In one example, the scheduler 118 selects one of the suggested meeting times and saves the calendar item. In another example, the scheduler 118 selects a blocked off timeslot 302 and saves the calendar item.

The method 424 proceeds to OPERATION 436, where the calendar item is scheduled, and meeting invitations are sent to attendees. At OPTIONAL OPERATION 438, a notification is provided to users 102 for whom the selected meeting time causes an attention-based scheduling conflict. For example, the notification notifies the user 102 of the attention-based scheduling conflict, which allows the user 102 to ignore the notification and accept the meeting invitation or to decline the meeting invitation based on the attention-based scheduling conflict. The method 424 ends at OPERATION 440.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
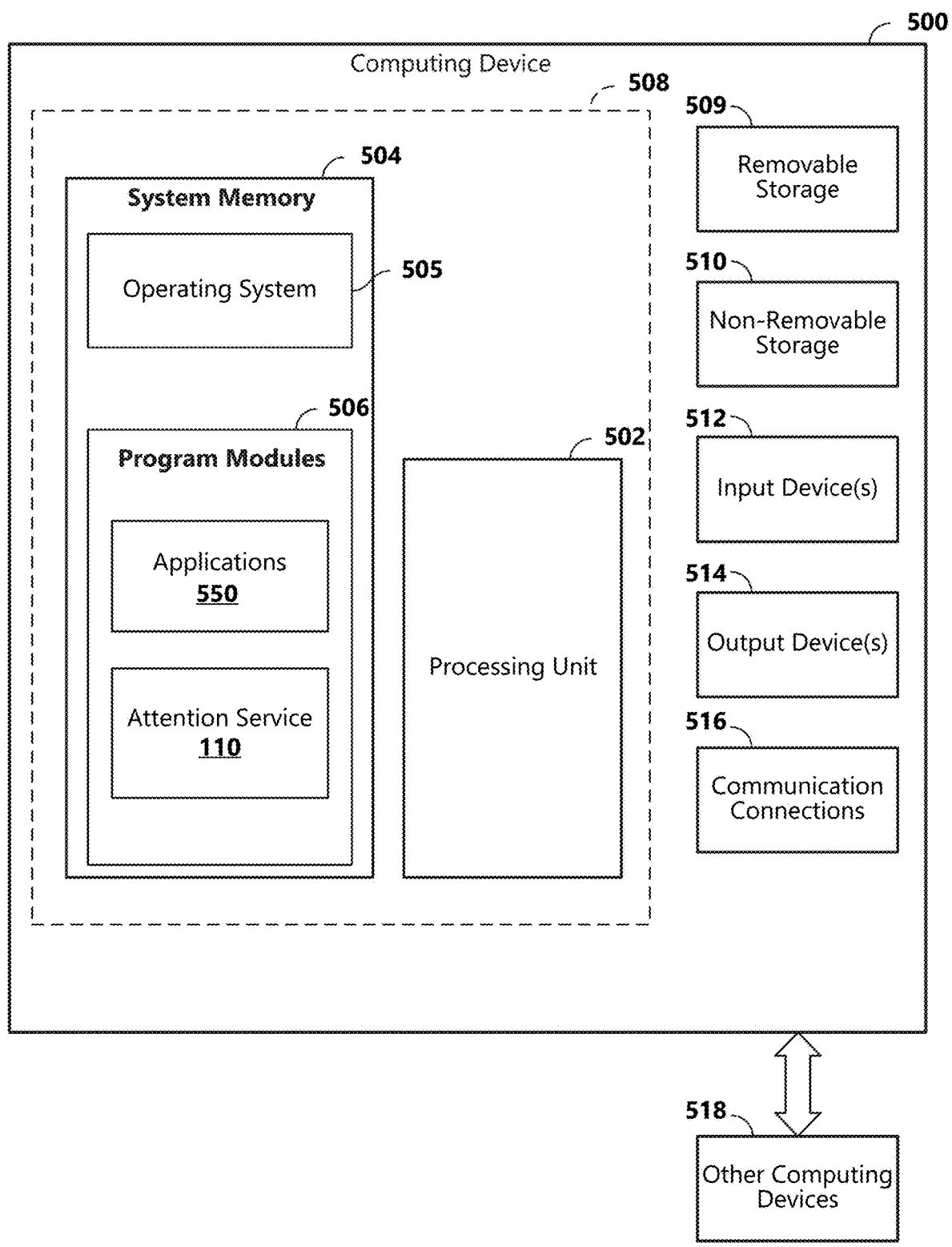
FIG. 5 is a block diagram illustrating example physical components of a computing device.
Figure 6A:
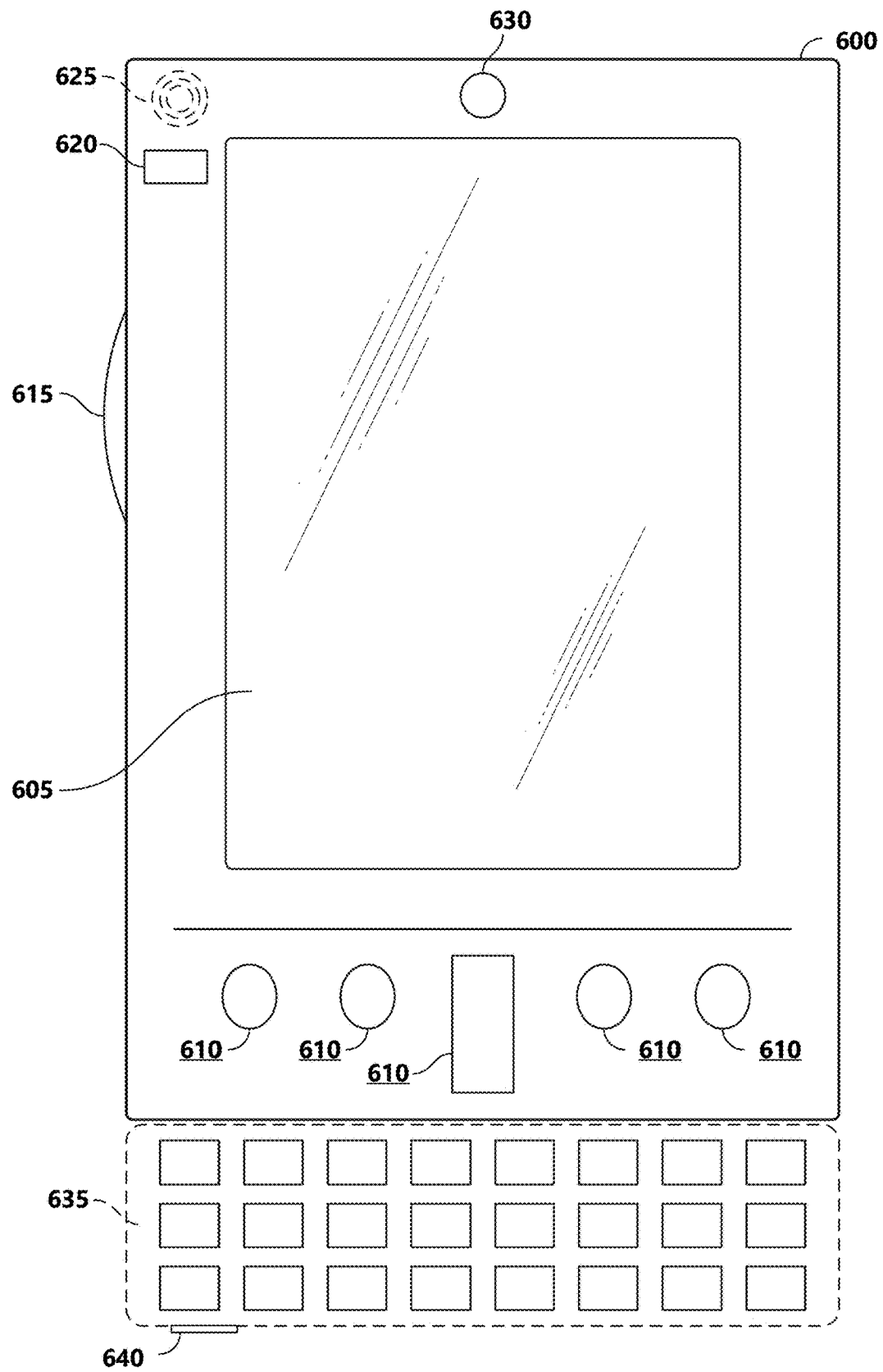
FIGS. 6A and 6B are simplified block diagrams of a mobile computing device.
Figure 6B:
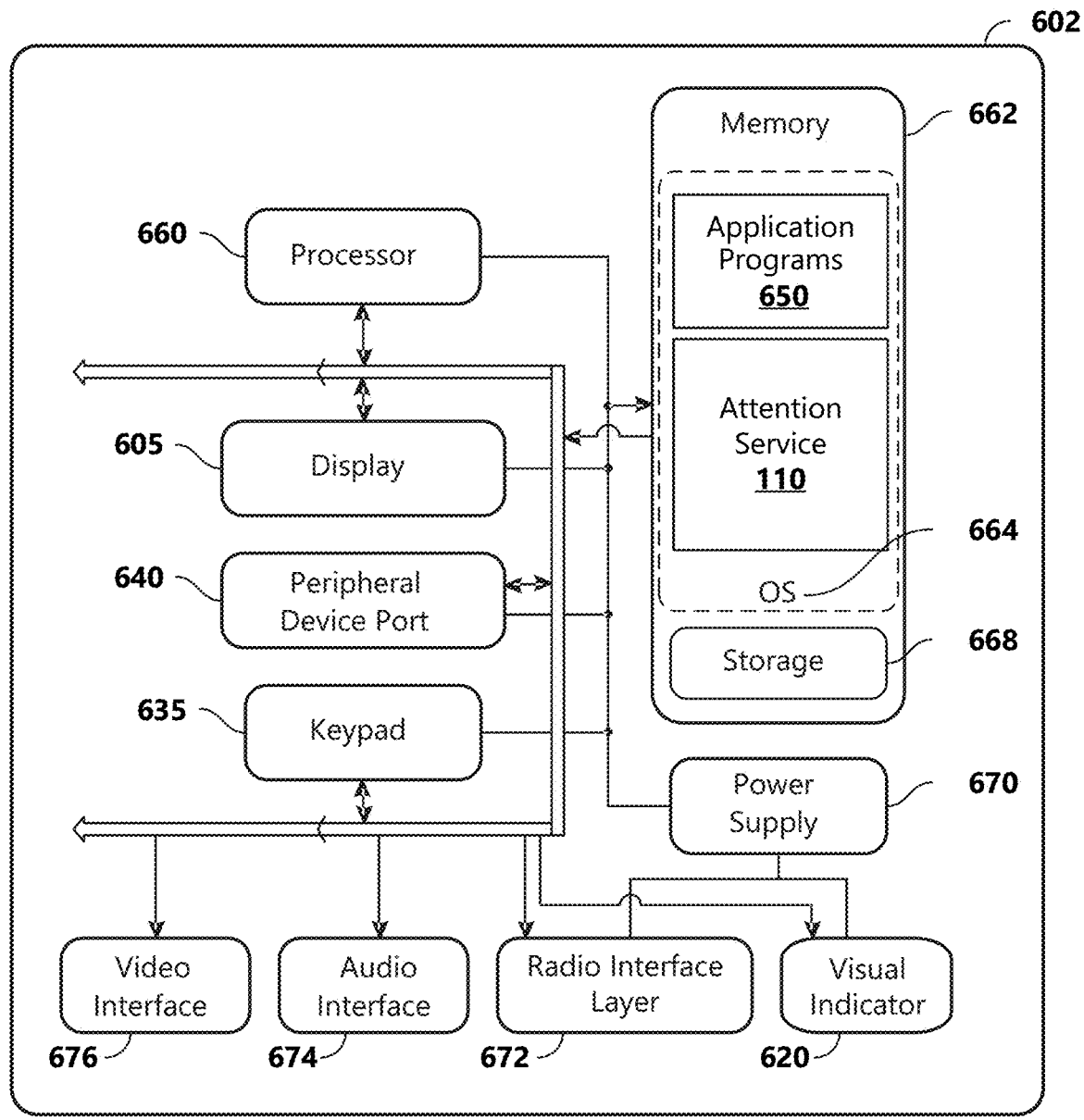
Figure 7:
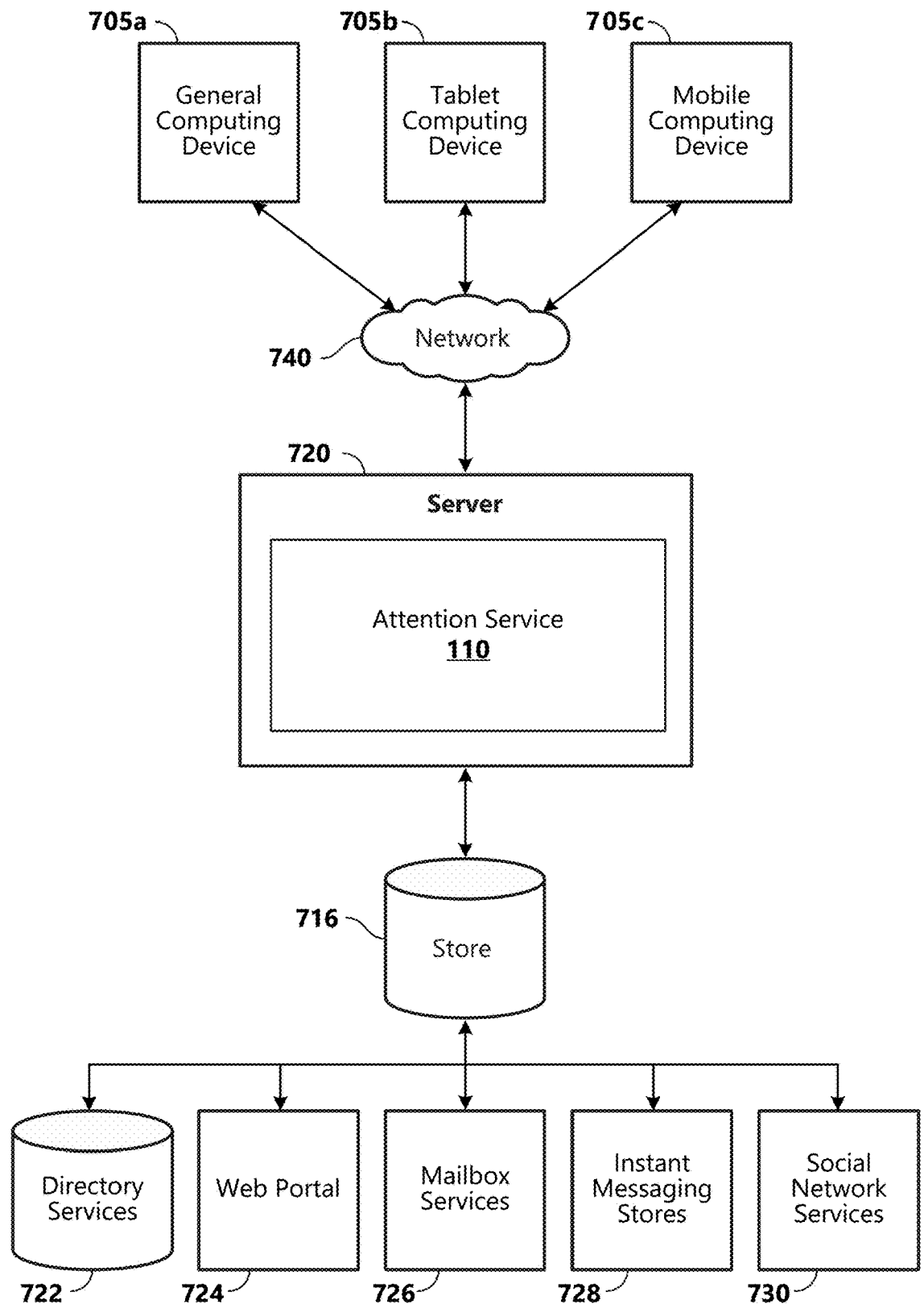
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550.

According to an aspect, the system memory 504 includes the attention service 110. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., attention service 110) perform processes including, but not limited to, one or more of the stages of the methods 400 and 424 illustrated in FIGS. 4A and 4B. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the attention service 110 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for selecting and moving content as described above. Content developed, interacted with, or edited in association with the attention service 110 is enabled to be stored in different communication channels or other storage types. For example, various documents may be stored using a directory service 722, a web portal 724, a mailbox service 726, an instant messaging store 728, or a social networking site 730. The attention service 110 is operative to use any of these types of systems or the like for selecting and moving content, as described herein. According to an aspect, a server 720 provides the attention service 110 to clients 705*a,b,c*. As one example, the server 720 is a web server providing the attention service 110 over the web. The server 720 provides the attention service 110 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method performed by a computer for providing attention-based scheduling, comprising:
   collecting, by the computer, data associated with one or more applications executing on the computer that are accessed by a user during a scheduled meeting;
   identifying, by the computer, one or more attention-based conditions associated with the user's productivity based in part on the collected data;
   receiving, at the computer, input from a scheduler via an electronic application calendar window provided for display in a user interface of an electronic calendar application, the input associated with scheduling a new calendar item associated with the user at a selected timeslot;
   determining, by the computer, whether the new calendar item generates an attention-based scheduling conflict for the user based on the one or more attention-based conditions and the selected timeslot;
   when the attention-based scheduling conflict is generated and before the new calendar item is scheduled at the selected timeslot, providing, by the computer, a notification for display in the electronic application calendar window notifying the scheduler of the attention-based scheduling conflict; and
   providing, by the computer, one or more alternative timeslots for display in the user interface that do not generate an attention-based scheduling conflict for the user.

2. The method of claim 1, wherein identifying the one or more attention-based conditions comprises receiving user-specified information indicating the user's high and off-peak productivity times.

3. The method of claim 1, wherein identifying the one or more attention-based conditions comprises:
   determining the user's high and off-peak productivity times based on user performance in completing cognitive exercises.

4. The method of claim 1, wherein identifying the one or more attention-based conditions comprises determining the user's high and off-peak productivity times based on general or group-sourced attention data.

5. The method of claim 1, wherein identifying the one or more attention-based conditions comprises:
   receiving user interaction data, the user interaction data comprising data associated with scheduling calendar items and responding to meeting requests; and
   analyzing the user interaction data for determining the user's high and off-peak productivity times.

6. The method of claim 1, wherein identifying the one or more attention-based conditions comprises:
   analyzing the collected data for determining the user's high and off-peak productivity times.

7. The method of claim 1, wherein determining that the new calendar item generates the attention-based scheduling conflict comprises at least one of:
   determining that the new calendar item occurs during an off-peak productivity time for the user; and
   determining that the new calendar item occurs during a time period where a predetermined or user-specified threshold is exceeded.

8. The method of claim 7, wherein determining that the new calendar item occurs during the time period where the predetermined or user-specified threshold is exceeded comprises:
   determining that the new calendar item occurring at the selected timeslot exceeds a predetermined or user-specified maximum number of calendar items for the time period.

9. The method of claim 7, wherein determining that the new calendar item occurs during the time period where the predetermined or user-specified threshold is exceeded comprises:
   analyzing the new calendar item to determine a category or type of the new calendar item; and
   based on the determined category or type of the new calendar item, determining whether addition of the new calendar item to previously-scheduled calendar items in the time period exceeds a predetermined or user-specified maximum number of calendar items of a particular category or type for the time period.

10. The method of claim 9, wherein analyzing the new calendar item to determine the category or type of the new calendar item comprises:
    identifying a user-selected category or type for the new calendar item; or
    parsing calendar item input associated with the new calendar item; and
    determining the category or type of the new calendar item based on the parsed input.

11. The method of claim 1, wherein when the attention-based scheduling conflict is generated, the method further comprising at least one of:
    providing a notification alerting the user of the attention-based scheduling conflict;
    blocking out timeslots in the user's calendar that occur during off-peak productivity times;
    blocking out timeslots in the user's calendar where the new calendar item exceeds a predetermined or user-specified maximum number of calendar items for a time period; and
    blocking out timeslots in the user's calendar where the new calendar item exceeds a predetermined or user-specified maximum-number of calendar items of a particular category or type for a time period.

12. The method of claim 11, wherein providing the notification notifying the scheduler or the notification alerting the user of the attention-based scheduling conflict comprises at least one of:
    notifying the scheduler of the new calendar item where the user is an invitee; and
    notifying the user in a meeting request for the new calendar item.

13. A system for providing attention-based scheduling, the system comprising a computing device, the computing device comprising:
    at least one processing device; and
    at least one computer readable data storage device storing instructions that, when executed by the at least one processing device are operative to:

collect data associated with one or more applications executing on the computing device that are accessed by a user during a scheduled meeting;

identify one or more attention-based conditions associated with the user's productivity based in part on the collected data;

receive input from a scheduler via an electronic application calendar window provided for display in a user interface of an electronic calendar application, the input associated with scheduling a new calendar item associated with the user at a selected timeslot;

determine whether the new calendar item generates an attention-based scheduling conflict for the user based on the one or more attention-based conditions and the selected timeslot;

when the attention-based scheduling conflict is generated and before the new calendar item is scheduled at the selected timeslot, provide a notification for display in the electronic application calendar window notifying the scheduler of the attention-based scheduling conflict; and provide one or more alternative timeslots for display in the user interface that do not generate an attention-based scheduling conflict for the user.

14. The system of claim 13, wherein in determining that the new calendar item generates the attention-based scheduling conflict, the computing device is operative to determine at least one of:

that the new calendar item occurs during an off-peak productivity time for the user; and that the new calendar item occurs during a time period where a predetermined or user-specified threshold is exceeded, wherein the predetermined or user-specified threshold is a maximum number of calendar items for the time period or a maximum number of calendar items of a particular category or type for the time period.

15. The system of claim 14, wherein in determining that the new calendar item occurring at the selected timeslot exceeds the predetermined or user-specified maximum number of calendar items of the particular category or type for the time period, the computing device is operative to:

analyze the new calendar item to determine a category or type of the new calendar item; and based on the determined category or type of the new calendar item, determine whether addition of the new calendar item to previously-scheduled calendar items in the time period exceeds the predetermined or user-specified maximum number of calendar items of the particular category or type for the time period.

16. The system of claim 15, wherein in analyzing the new calendar item to determine the category or type of the new calendar item, the computing device is operative to:

identify a user-selected category or type for the new calendar item; or parse calendar item input associated with the new calendar item; and determine the category or type of the new calendar item based on the parsed input.

17. The system of claim 13, wherein in identifying the one or more attention-based conditions, the computing device is operative to:

receive user-specified information indicating the user's high and off-peak productivity times;

determine the user's high and off-peak productivity times based on user performance in completing cognitive exercises;

determine the user's high and off-peak productivity times based on general or group-sourced attention data; and determine the user's high and off-peak productivity times based on user interaction by:

receiving user interaction data, the user interaction data comprising data associated with scheduling calendar items and responding to meeting requests; and analyzing the user interaction data for determining the user's high and off-peak productivity times; or analyzing the collected data for determining the user's high and off-peak productivity times.

18. The system of claim 13, wherein when the attention-based scheduling conflict is generated, the computing device is further operative to:

provide a notification alerting the user of the attention-based scheduling conflict;

block out timeslots in the user's calendar that occur during off-peak productivity times;

block out timeslots in the user's calendar where the new calendar item exceeds a predetermined or user-specified maximum number of calendar items for a time period; or block out timeslots in the user's calendar where the new calendar item exceeds a predetermined or user-specified maximum number of calendar items of a particular category or type for a time period.

19. A computer readable storage device including computer readable instructions, which when executed by a processing unit of a computing device is operative to:

collect data associated with one or more applications executing on the computing device that are accessed by a user during a scheduled meeting;

identify one or more attention-based conditions associated with the user's productivity based in part on the collected data;

receive input from a scheduler via an electronic application calendar window provided for display in a user interface of an electronic calendar application, the input associated with scheduling a new calendar item associated with the user at a selected timeslot;

determine whether the new calendar item generates an attention-based scheduling conflict for the user based on the one or more attention-based conditions and the selected timeslot;

when the attention-based scheduling conflict is generated and before the new calendar item is scheduled at the selected timeslot, provide a notification for display in the electronic application calendar window notifying the scheduler of the attention-based scheduling conflict, and at least one of:

providing a notification alerting the user of the attention-based scheduling conflict;

blocking out timeslots in the user's calendar that occur during off-peak productivity times;

blocking out timeslots in the user's calendar where the new calendar item exceeds a predetermined or user-specified maximum number of calendar items for a time period; and blocking out timeslots in the user's calendar where the new calendar item exceeds a predetermined or user-specified maximum number of calendar items of a particular category or type for a time period; and provide one or more alternative timeslots for display in the user interface that do not generate an attention-based scheduling conflict for the user.

20. The computer readable storage device of claim 19, wherein in determining that the new calendar item generates the attention-based scheduling conflict, the processing unit of the computing device is operative to determine at least one of:
- that the new calendar item occurs during an off-peak productivity time for the user; and
- that the new calendar item occurs during a time period where a predetermined or user-specified threshold is exceeded, wherein the predetermined or user-specified threshold is the predetermined or user-specified maximum number of calendar items for the time period or the predetermined or user-specified maximum number of calendar items of the particular category or type for the time period.

* * * * *